US009684602B2

(12) United States Patent
Maeda

(10) Patent No.: US 9,684,602 B2
(45) Date of Patent: Jun. 20, 2017

(54) MEMORY ACCESS CONTROL DEVICE, CACHE MEMORY AND SEMICONDUCTOR DEVICE

(71) Applicant: Kabushiki Kaisha Toshiba, Minato-ku, Tokyo (JP)

(72) Inventor: Seiji Maeda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 44 days.

(21) Appl. No.: 14/931,724

(22) Filed: Nov. 3, 2015

(65) Prior Publication Data

US 2016/0267010 A1    Sep. 15, 2016

Related U.S. Application Data

(60) Provisional application No. 62/131,526, filed on Mar. 11, 2015.

(51) Int. Cl.
*G06F 12/08* (2016.01)
*G06F 12/0875* (2016.01)

(52) U.S. Cl.
CPC .. *G06F 12/0875* (2013.01); *G06F 2212/1016* (2013.01); *G06F 2212/45* (2013.01)

(58) Field of Classification Search
None
See application file for complete search history.

(56) References Cited

U.S. PATENT DOCUMENTS

| | | | |
|---|---|---|---|
| 5,991,847 A | 11/1999 | Ballard et al. | |
| 6,490,654 B2 | 12/2002 | Wickeraad et al. | |
| 6,754,776 B2 | 6/2004 | Conway et al. | |
| 7,853,775 B2 | 12/2010 | Kyo | |
| 8,051,273 B2 | 11/2011 | Kyo | |
| 8,078,803 B2 | 12/2011 | Speier et al. | |
| 8,112,613 B2 | 2/2012 | Kyo | |
| 8,200,735 B2 | 6/2012 | Inoue | |
| 8,291,194 B2 | 10/2012 | Tsai et al. | |
| 8,386,716 B2 | 2/2013 | Speier et al. | |
| 2004/0049641 A1 | 3/2004 | So et al. | |
| 2005/0160228 A1 | 7/2005 | Teruyama | |
| 2006/0143396 A1 | 6/2006 | Cabot | |
| 2013/0166519 A1 | 6/2013 | Matsuse | |
| 2015/0261675 A1 | 9/2015 | Usui et al. | |

FOREIGN PATENT DOCUMENTS

JP   53-064439 A   6/1978
JP   07-095307 B   10/1995

OTHER PUBLICATIONS

David A. Patterson, et al., "Computer Organization and Design," Aug. 16, 2004, Third Edition, pp. 549-579.
U.S. Appl. No. 14/641,827, filed Mar. 9, 2015, Maeda.

*Primary Examiner* — Kevin Verbrugge
(74) *Attorney, Agent, or Firm* — Knobbe, Martens, Olson & Bear, LLP

(57) ABSTRACT

A memory access control device of an embodiment includes a data memory configured to record information of an access request relating to reading and writing of data to a main memory, and a controller configured to receive notification of the access request and select an access destination with reference to recording content of the data memory. When history of a request for write access and history of a request for read access to an address designated by the access request are recorded in the data memory, the controller selects a cache memory as the access destination, and otherwise, selects the main memory as the access destination.

20 Claims, 3 Drawing Sheets

MEMORY ACCESS CONTROL DEVICE, CACHE MEMORY AND SEMICONDUCTOR DEVICE

FIELD

An embodiment described herein relates generally to a memory access control device, a cache memory and a semiconductor device.

BACKGROUND

Conventionally, when an arithmetic device such as a CPU, an I/O device such as a storage, or the like, accesses data on a main memory, in order to suppress delay to improve transfer speed and to reduce power consumption, a cache memory for temporarily storing data is used. A cache memory is comprised of an SRAM, or the like, which operates at higher speed than a main memory. The CPU, or the like, can perform high speed processing by accessing data stored in the cache memory.

Typically, the cache memory is comprised of a cache line array for temporarily storing data, and a cache tag indicating which region of the main memory is temporarily stored in the cache line array.

Conventionally, the arithmetic device and the I/O device share a single cache memory. Therefore, when the arithmetic device and the I/O device access the main memory at the same time, the cache line array of the cache memory is used at the same time. In such a case, capacity of the cache line array which can be used for the I/O device is reduced. Then, for example, also when data is simply transferred from an input device to a storage device, because data cannot be temporarily held in the cache line array due to small capacity of the cache line array which can be used for the I/O device, it is necessary to access the main memory to read and write data, and, because a cache hit ratio decreases, the transfer speed decreases and power consumption increases.

DETAILED DESCRIPTION

An embodiment will be described below with reference to the drawings.

Configuration

Figure 1:
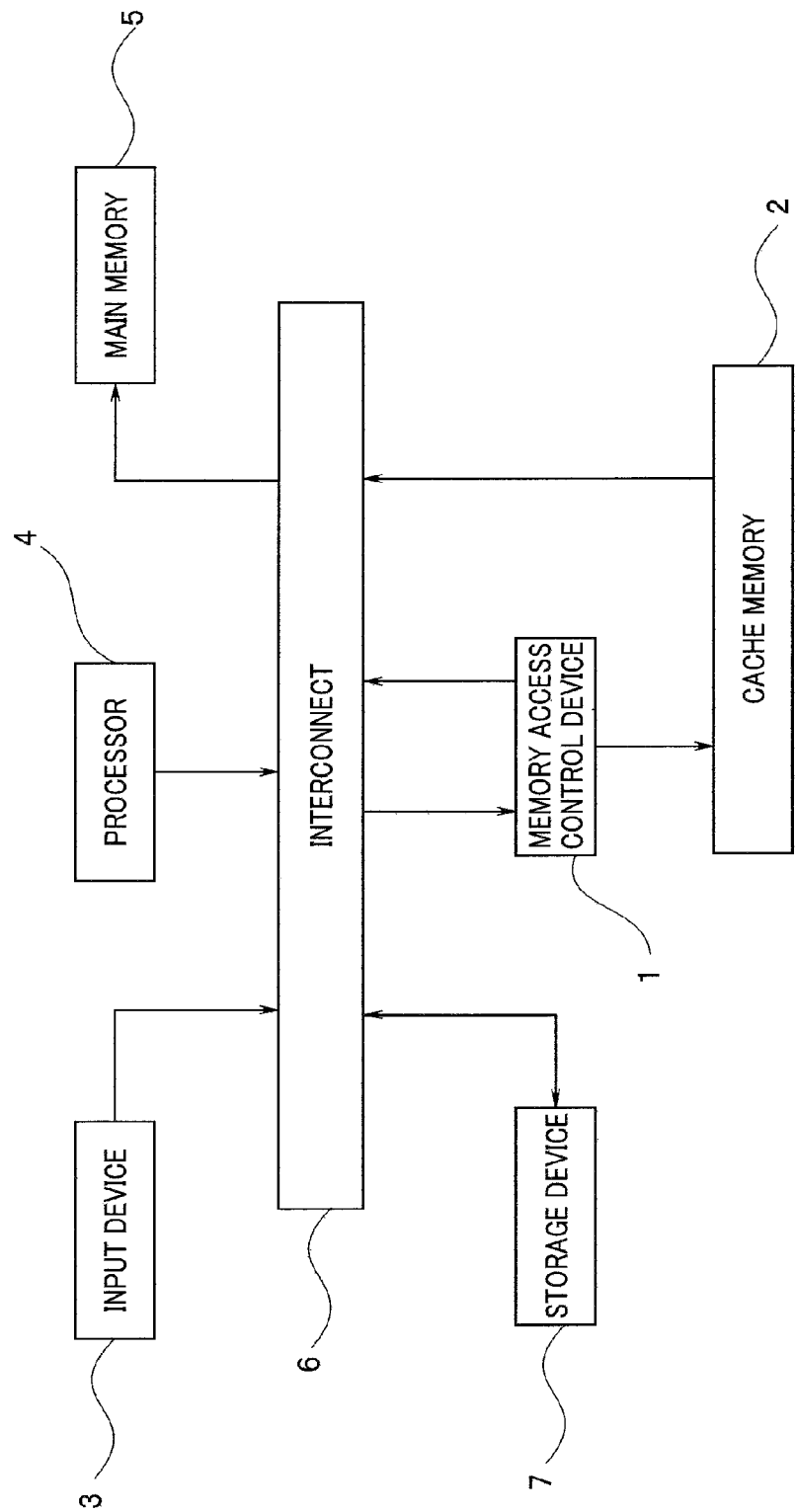
FIG. 1 is a schematic block diagram for explaining one example of a system including a memory access control device 1 of an embodiment.

FIG. 1 is a schematic block diagram for explaining a system including a memory access control device 1 according to an embodiment of the present invention. The system including the memory access control device 1 of the present embodiment is mainly configured with a cache memory 2, an input device 3, a processor 4 including a central processing unit (hereinafter, referred to as a CPU), a main memory 5, an interconnect 6, and a storage device 7. The memory access control device 1, the cache memory 2, the input device 3, the processor 4, the main memory 5 and the storage device 7 are connected to each other via the interconnect 6.

When each module of the processor 4, the input device 3 and the storage device 7 requests access to the main memory 5, the memory access control device 1 controls which of the main memory 5 and the cache memory 2 is to be accessed.

The cache memory 2 temporarily stores various kinds of data to be stored in the main memory 5. More specifically, the cache memory 2 holds data stored from the processor 4, data inputted from the input device 3 and data acquired from the main memory 5.

The input device 3 records data in the storage device 7 and the main memory 5. For example, a camera corresponds to the input device 3.

The processor 4 carries out operation of various kinds of data. The processor 4 acquires data (including a program) required for the operation from the cache memory 2 or the main memory 5 by way of the interconnect 6. From which of the cache memory 2 and the main memory 5 data, or the like, is acquired is determined by the memory access control device 1.

The main memory 5 records data outputted from the input device 3, the processor 4 and the cache memory 2.

The storage device 7 records data, or the like, transferred from the input device 3. For example, a hard disk corresponds to the storage device 7.

Figure 2:
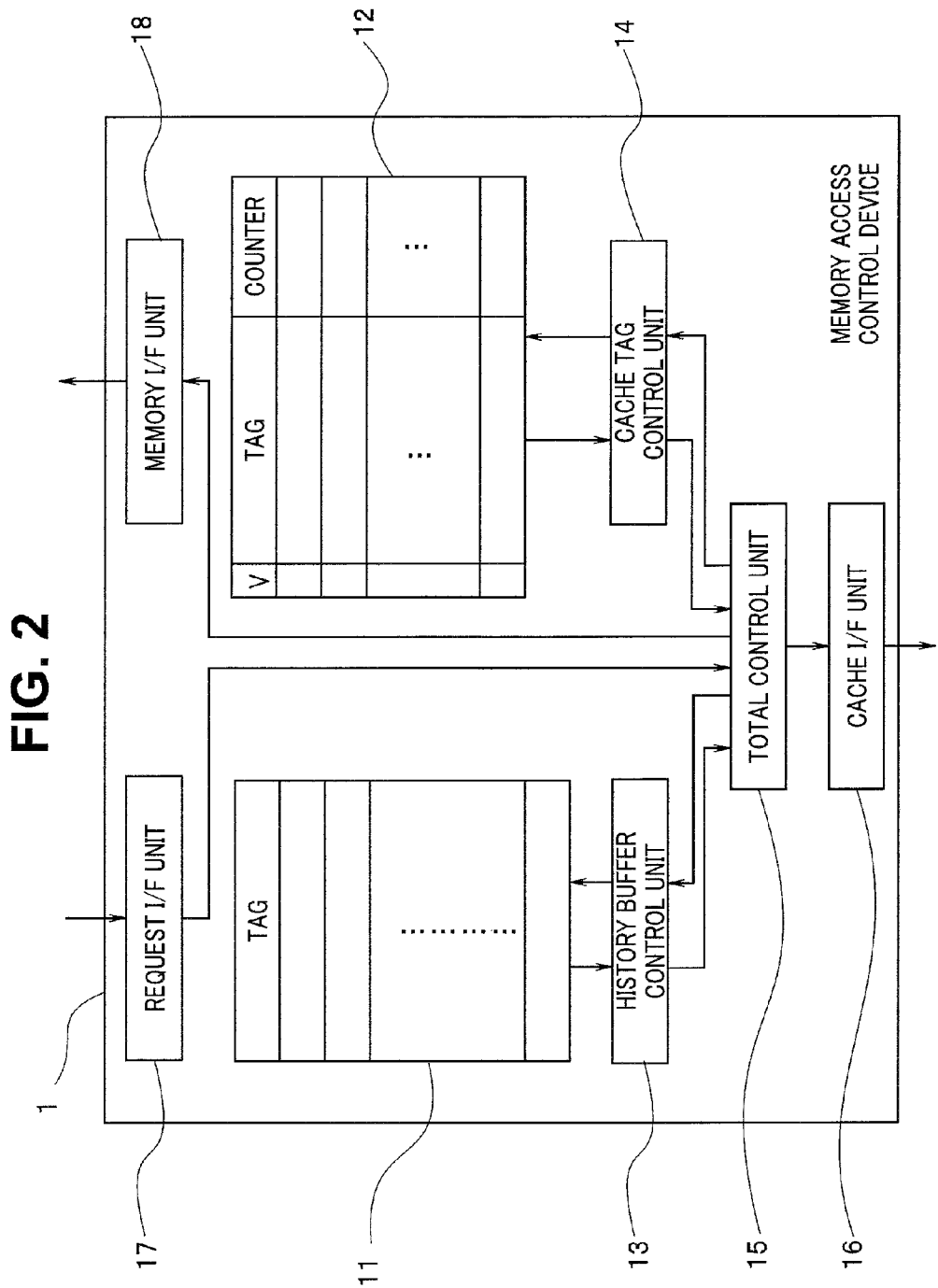
FIG. 2 is a schematic block diagram for explaining one example of the memory access control device 1 of the embodiment.

A detailed configuration of the memory access control device 1 will be described next. FIG. 2 is a schematic block diagram for explaining an example of the memory access control device 1. The memory access control device 1 is mainly configured with a history buffer unit 11 as a data memory, a cache tag unit 12, a history buffer control unit 13, a cache tag control unit 14 and a total control unit 15 as controllers, a cache I/F unit 16 configured to transmit and receive data to and from the cache memory 2, a request I/F unit 17 configured to transmit and receive data to and from the interconnect 6, and a memory I/F unit 18 configured to transmit and receive data to and from the main memory 5.

The history buffer unit 11 is a mechanism for holding a history of write access from the interconnect 6. The history buffer unit 11 is configured with a plurality of history tag entries. Part of a write destination address of data is stored in one history tag entry as a tag based on write access. While it is desirable that the number of history tag entries to be placed in the history buffer unit 11 be larger than the number of entries of the cache tag (mechanism for holding a write destination address of data temporarily stored in the cache memory 2) provided at the cache memory 2, capacity of the history buffer unit 11 may be made equal to or smaller than capacity of the cache memory 2.

The cache tag unit 12 is a mechanism for holding information relating to a region (address) which is likely to be temporarily stored in the cache memory 2. The cache tag unit 12 is comprised of a plurality of cache tag entries. Each of the cache tag entries is comprised of a significant bit (V) for identifying whether or not the entry is valid, a tag which is part of the write destination address of data, and a counter indicating a rate of access to the address indicated by the tag. Note that the counter holds a numerical value which enables identification of a balance between write access and read access, that is, an amount of data which is written in the address indicated in the tag but which is not read. That is, the counter does not merely hold the number of times of write access and read access. While it is desirable that the number of cache tag entries be adapted for the capacity of the cache memory 2, the number of cache tag entries may be equal to or smaller than the capacity of the cache memory 2.

The history buffer control unit 13 controls the history buffer unit 11 according to an instruction from the total control unit 15. More specifically, the history buffer control unit 13 confirms content of a tag entry held by the history buffer unit 11, responds to an inquiry from the total control unit 15 and rewrites the history tag entry as necessary.

The cache tag control unit 14 controls the cache tag unit 12 according to an instruction from the total control unit 15. More specifically, the cache tag control unit 14 confirms content of a cache tag entry held by the cache tag unit 12, responds to an inquiry from the total control unit 15 and rewrites the cache tag entry as necessary.

When each module of the processor 4, the input device 3 and the storage device 7 requests access to the main memory 5 (a write access request or a read access request), the total control unit 15 receives notification of the access request via the request I/F unit 17 and determines which of the main memory 5 and the cache memory 2 is to be accessed. More specifically, the total control unit 15 makes inquiries to the history buffer control unit 13 and the cache tag control unit 14 about content of entries stored in the history buffer unit 11 and the cache tag unit 12 and determines an access destination according to the response.

The request I/F unit 17 is an interface for inputting an access request (access request information) to the main memory 5. Note that the access request information is a write destination address, data to be written and a size (data size) in the case of the write access, and a read destination address and a size of data (data size) to be read in the case of the read access.

The cache I/F unit 16 is an interface for outputting the access request to the cache memory 2 via the interconnect 6.

The memory I/F unit 18 is an interface for outputting the access request to the main memory 5 via the interconnect 6.

Operation

Operation of the memory access control device 1 in the present embodiment will be described next. First, a case will be described where a request for write access to the main memory 5 occurs.

When a request for write access to the main memory 5 occurs from each module, the memory access control device 1 is notified of the request for write access from the interconnect 6. More specifically, the total control unit 15 is notified of the request for write access which is comprised of a write address, data and a data size from the interconnect 6 via the request I/F unit 17.

The total control unit 15 inputs the write address to the history buffer control unit 13. The history buffer control unit 13 generates a tag from the inputted write address and stores the tag in a history tag entry of the history buffer unit 11. When tags are stored in all the history tag entries of the history buffer unit 11, for example, one of the history tag entries is selected using a reference such as the oldest entry, and content of the entry is replaced so that the tag generated from the write address is stored.

The total control unit 15 also inputs the write address, the data and the data size to the cache tag control unit 14. The cache tag control unit 14 generates a tag from the write address and searches an entry having the same tag as the generated tag from the cache tag entries stored in the cache tag unit 12.

When there is a cache tag entry having the same tag as the generated tag, the cache tag control unit 14 increases data stored in the counter of the cache tag entry according to the notified data size. For example, when the data size is 8 bytes, and the stored data is 10 bytes, data of the counter is increased by 8 to be made 18 bytes. Note that data to be stored in the counter may be data such as a value proportional to the data size, which can be used to identify whether the data size is large or small, instead of the number of bytes of write data. The cache tag control unit 14 notifies the total control unit 15 so as to select the cache memory 2 as a data write destination.

On the other hand, when there is no cache tag entry having the same tag as the generated tag, the cache tag control unit 14 notifies the total control unit 15 so as to select the main memory 5 as the data write destination.

The total control unit 15 performs notification of the write access according to the notification from the cache tag control unit 14. That is, when the total control unit 15 is notified so as to select the main memory 5 as the write destination, the total control unit 15 notifies the main memory 5 of the request for write access via the memory I/F unit 18 and the interconnect 6. Further, when the total control unit 15 is notified so as to select the cache memory 2 as the write destination, the total control unit 15 notifies the cache memory 2 of the request for write access via the cache I/F unit 16. Through the above-described series of operation, processing of the memory access control device 1 in the case where the request for write access occurs is completed.

A case will be described next where a request for read access to the main memory 5 occurs. When a request for read access to the main memory 5 occurs from each module, the memory access control device 1 is notified of the request for read access from the interconnect 6. More specifically, the total control unit 15 is notified of the request for read access comprised of a read address and a size of data to be read from the interconnect 6 via the request I/F unit 17.

The total control unit 15 inputs the read address and the data size to the cache tag control unit 14. The cache tag control unit 14 generates a tag from the read address and searches an entry which has the same tag as the generated tag and which is valid (for example, a significant bit is "1") from the cache tag entries stored in the cache tag unit 12.

When there is a cache tag entry which has the same tag as the generated tag and which is valid, the cache tag control unit 14 decreases data stored in the counter of the cache tag entry according to the notified data size. For example, when the data size is 8 bytes, and the stored data is 10 bytes, data of the counter is decreased by 8 to be made 2 bytes. The cache tag control unit 14 then notifies the total control unit 15 so as to select the cache memory 2 as a data read destination.

On the other hand, when there is no cache tag entry which has the same tag as the generated tag and which is valid, the cache tag control unit 14 notifies the total control unit 15 so as to select the main memory 5 as the data read destination.

The total control unit 15 performs notification of the read access according to the notification from the cache tag control unit 14. That is, when the total control unit 15 is notified so as to select the cache memory 2 as the read destination, the total control unit 15 notifies the cache memory 2 of the request for read access via the cache I/F unit 16. Further, when the total control unit 15 is notified so as to select the main memory 5 as the read destination, the total control unit 15 notifies the main memory 5 of the request for read access via the memory I/F unit 18 and the interconnect 6 and notifies the history buffer control unit 13 of the read address.

The history buffer control unit 13 generates a tag from the read address. The history buffer control unit 13 then searches a history tag entry which stores the same tag as the generated tag from the history tag entries of the history buffer unit 11. When there is no entry having the same tag as the generated tag, processing of the memory access control device 1 in the case where the request for read access occurs is completed.

On the other hand, when there is an entry having the same tag as the generated tag, the history buffer control unit 13 notifies the cache tag control unit 14 of addition of the cache tag entry.

When the cache tag control unit 14 is notified of addition of the cache tag entry from the history buffer control unit 13, the cache tag control unit 14 searches an invalid entry (for example, a significant bit is "0") from the cache tag entries stored in the cache tag unit 12. When search is successful, the cache tag control unit 14 selects one arbitrary entry from invalid entries.

On the other hand, when there is no invalid entry, that is, when all the entries are used, for example, one entry is appropriately selected using the following logic, or the like.

A first logic is a method in which an entry which has not been referred to for the longest time period is selected using an LRU.

A second logic is a method in which an entry having a value of the counter greater than a first threshold is selected. That is, when a frequency of the read request is less than a frequency of the write request, an amount of write data to the address indicated by the tag becomes greater than an amount of read data, and the value of the counter increases. In such a case, because the address provides weak cache effect, it can be judged that it is better to replace the address with another address which can provide cache effect.

A third logic is a method in which an entry having a value of the counter less than a second threshold is selected.

Further, an entry may be selected using these three logics in combination appropriately. For example, first, an entry may be selected using the second logic, and, when there are a plurality of entries having a value of the counter greater than the first threshold, an entry may be further extracted using the third logic. When an entry is selected using the plurality of logics, it is preferable that the logics be used in order of the second logic, the third logic and the first logic.

Note that the first threshold and the second threshold are not limited to particular values, and appropriate values can be set taking into account a size of the cache line array which is disposed in the cache memory 2 and which temporarily stores data. Further, the logic used for selecting an entry is not limited to the above-described three logics, and other logics such as a logic for randomly selecting an entry can be used.

The cache tag control unit 14 stores the tag generated from the read address in the selected entry and initializes the value of the counter to zero. Further, the cache tag control unit 14 sets the significant bit at "1". Through the above-described series of operation, processing of the memory access control device 1 in the case where the request for read access occurs is completed.

Note that even when the cache tag control unit 14 is not notified of addition of the cache tag entry from the history buffer control unit 13, the cache tag control unit 14 may monitor the value of the counter of the cache tag entry stored in the cache tag unit 12 and may make the cache tag entry whose value of the counter becomes greater than the first threshold invalid (set the significant bit at "0").

In this manner, according to the present embodiment, history of the write access is managed by the history buffer unit 11 provided at the memory access control device 1. Further, the balance between the write access and the read access to the cache memory 2 is managed by the cache tag unit 12 for each tag using the counter. Use of the counter enables control so that writing of data in the cache memory 2 is prioritized over other write access requests such as arithmetic processing when an access request for read which requests to read all data of the same address occurs following the request for write access to a specific address. It is therefore possible to improve a cache hit ratio when data is simply transferred from the input device to the storage device. Further, because it is possible to reduce a frequency of access to the main memory 5 upon data transfer, it is possible to realize power saving.

Further, because the memory access control device 1 of the present embodiment is provided outside the cache memory 2, the memory access control device 1 can be used by being connected to the existing cache memory, so that it is possible to realize efficient access to the cache memory.

Figure 3:
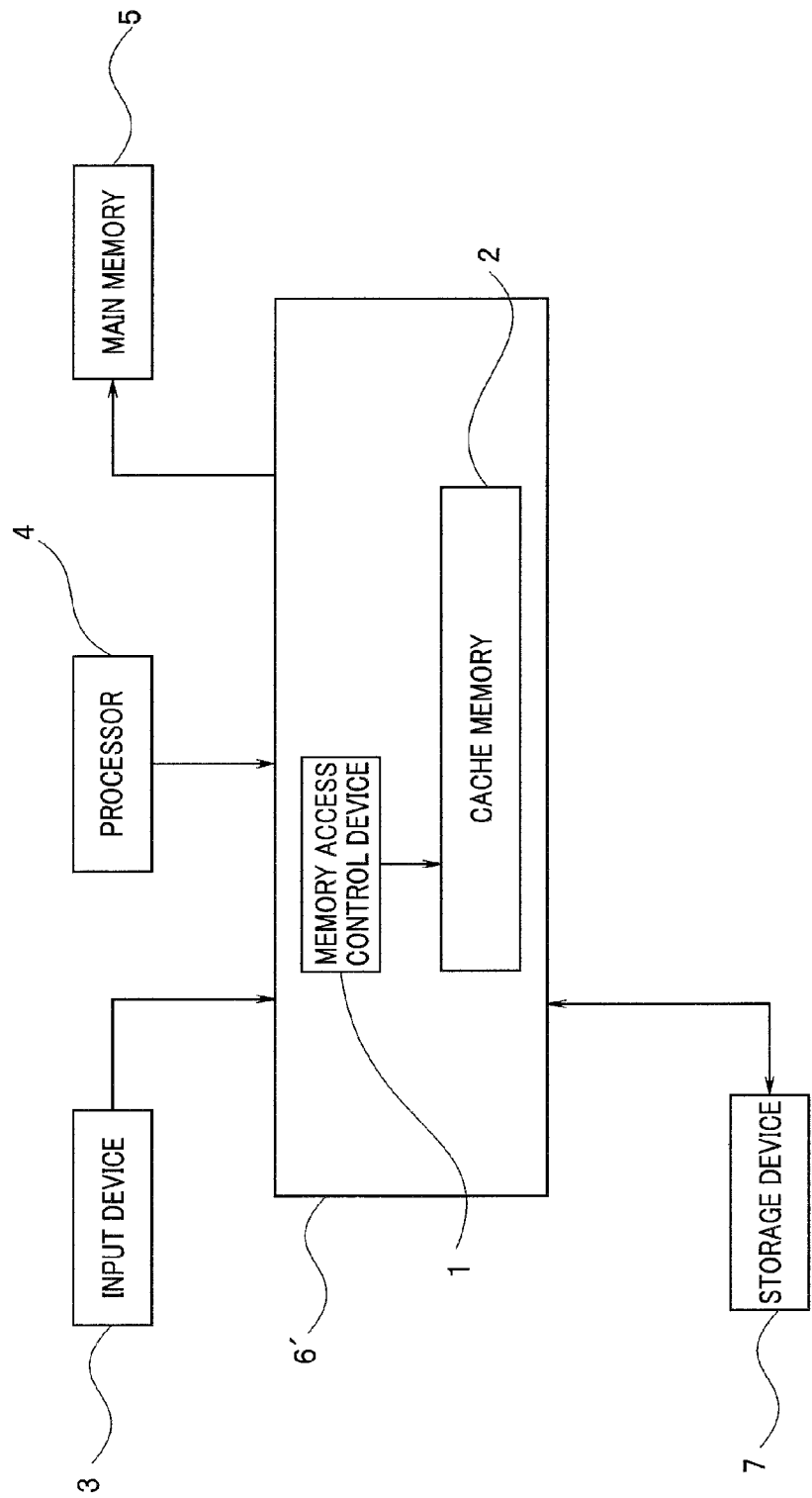
FIG. 3 is a schematic block diagram for explaining another example of the system including the memory access control device 1 of the embodiment.

Note that while the memory access control device 1 is disposed between the interconnect 6 and the cache memory 2 in the above-described embodiment, as illustrated in FIG. 3, the memory access control device 1 and the cache memory 2 may be configured so as to be incorporated into the interconnect 6'. FIG. 3 is a schematic block diagram for explaining another example of the system including the memory access control device 1 of the embodiment. That is, the memory access control device 1 may be disposed between a device which requests write access to the main memory 5, such as the processor 4, the input device 3 and the storage device 7, and the cache memory 2. The operation of the memory access control device 1 upon request for write access and request for read access in the configuration of FIG. 3 is the same as the operation of the memory access control device 1 in the configuration illustrated in FIG. 1.

As described above, according to the present embodiment, it is possible to improve a cache hit ratio upon data transfer.

Each "unit" such as a module in the present specification is conceptual and corresponds to each function of the embodiment, and does not necessarily correspond to specific hardware and software routine on a one-to-one basis. Therefore, in the present specification, the embodiment has been described assuming a virtual circuit block (unit) having each function of the embodiment.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A memory access control device comprising:
   a data memory configured to record information of an access request relating to reading and writing of data to a main memory; and
   a controller configured to receive the access request and select an access destination with reference to recording content of the data memory,
   wherein when history of a request for write access and a request for read access to an address designated by the access request is recorded in the data memory, the controller selects a cache memory as the access destination, and otherwise, selects the main memory as the access destination.

2. The memory access control device according to claim 1,
wherein the data memory comprises:
a history buffer unit configured to record information of history of the request for write access; and
a cache tag unit configured to record a balance between the request for write access and the request for read access to a same address.

3. The memory access control device according to claim 2,
wherein the cache tag unit comprises a plurality of cache tag entries, and
each of the cache tag entries comprises:
a tag indicating an address of a storage destination of the data; and
a counter indicating a difference between a size of the data written and a size of the data read.

4. The memory access control device according to claim 3,
wherein, when the controller receives the request for read access, if a valid cache tag entry for a tag indicating a read address does not exist in the cache tag unit and there is an entry having a same tag as a tag indicating the read address in the history buffer unit, the controller notifies the cache tag unit of addition of the cache tag entry.

5. The memory access control device according to claim 3,
wherein, when the controller receives the request for read access, if the cache tag entry designated by the request for read access does not exist in the cache tag unit and all the cache tag entries are set valid, the controller makes the cache tag entry satisfying predetermined conditions invalid.

6. The memory access control device according to claim 5,
wherein the controller makes the cache tag entry having a value of the counter exceeding a first threshold invalid.

7. The memory access control device according to claim 5,
wherein the controller makes the cache tag entry having a value of the counter less than a second threshold invalid.

8. The memory access control device according to claim 5,
wherein the controller makes the cache tag entry which is not referred to for a longest time period invalid.

9. A cache memory comprising:
a memory configured to temporarily hold data and an address of the data; and
a memory access control device,
wherein the memory access control device comprises:
a data memory configured to record information of an access request relating to reading and writing of data to a main memory; and
a controller configured to receive the access request and select an access destination with reference to recording content of the data memory, and
when history of a request for write access and history of a request for read access to an address designated by the access request are recorded in the data memory, the controller selects the memory as the access destination, and otherwise, selects the main memory as the access destination.

10. The cache memory according to claim 9,
wherein the data memory comprises:
a history buffer unit configured to record the history of the request for write access; and
a cache tag unit configured to record a balance between the request for write access and the request for read access to a same address.

11. The cache memory according to claim 10,
wherein the cache tag unit comprises a plurality of cache tag entries, and
each of the cache tag entries comprises:
a tag indicating an address of a storage destination of the data; and
a counter indicating a difference between a size of the data written and a size of the data read.

12. The cache memory according to claim 11,
wherein when the controller receives the request for read access, if a valid cache tag entry for a tag indicating a read address does not exist in the cache tag unit and there is an entry having a same tag as a tag indicating the read address in the history buffer unit, the controller notifies the cache tag unit of addition of the cache tag entry.

13. The cache memory according to claim 11,
wherein when the controller receives the request for read access, if the cache tag entry designated by the request for read access does not exist in the cache tag unit and all the cache tag entries are set valid, the controller makes the cache tag entry satisfying predetermined conditions invalid.

14. The cache memory according to claim 13,
wherein the controller makes the cache tag entry having a value of the counter exceeding a first threshold invalid.

15. The cache memory according to claim 13,
wherein the controller makes the cache tag entry having a value of the counter less than a second threshold invalid.

16. The cache memory according to claim 13,
wherein the controller makes the cache tag entry which is not referred to for a longest time period invalid.

17. A semiconductor device comprising:
a processor;
a main memory;
a cache memory configured to temporarily store data to be stored in the main memory and an address; and
a memory access control device,
wherein the memory access control device comprises:
a data memory configured to record information of an access request relating to reading and writing of data to the main memory; and
a controller configured to receive notification of the access request and select an access destination with reference to recording content of the data memory,
wherein, when history of a request for write access and history of a request for read access to an address designated by the access request are recorded in the data memory, the controller selects the cache memory as the access destination, and otherwise, selects the main memory as the access destination.

18. The semiconductor device according to claim 17,
wherein the data memory comprises:
a history buffer unit configured to record the history of the request for write access; and
a cache tag unit configured to record a balance between the request for write access and the request for read access to a same address.

19. The semiconductor device according to claim 18,
wherein the cache tag unit comprises a plurality of cache tag entries, and
each of the cache tag entries comprises:
a tag indicating an address of a storage destination of the data; and
a counter indicating a difference between a size of the data written and a size of the data read.

20. The semiconductor device according to claim 19,
wherein, when the controller receives the request for read access, if a valid cache tag entry for a tag indicating a read address does not exist in the cache tag unit and there is an entry having a same tag as a tag indicating the read address in the history buffer unit, the controller notifies the cache tag unit of addition of the cache tag entry.

* * * * *